United States Patent [19]
Rasmussen

[11] Patent Number: 6,079,192
[45] Date of Patent: Jun. 27, 2000

[54] ROW FINDER FOR A HARVESTING UNIT

[75] Inventor: James Joseph Rasmussen, Huxley, Iowa

[73] Assignee: Deere & Company, Moline, Ill.

[21] Appl. No.: 09/177,880

[22] Filed: Oct. 23, 1998

[51] Int. Cl.⁷ .................................................. A01D 75/28
[52] U.S. Cl. ........................... 56/10.2 F; 56/28; 56/15.5; 56/DIG. 11; 172/2; 172/5
[58] Field of Search ........................... 56/10.2 D, 10.2 F, 56/11.9, 13.5, 13.6, 28, 14.9, 15.5, 37, 288, DIG. 11, DIG. 15, DIG. 16; 172/2, 3, 5, 6, 446, 449

[56] References Cited

U.S. PATENT DOCUMENTS

| | | | |
|---|---|---|---|
| 3,196,599 | 7/1965 | Meiners et al. | 172/4 |
| 4,126,984 | 11/1978 | Gail | 56/10.2 |
| 4,249,365 | 2/1981 | Hubbard et al. | 56/28 |
| 4,470,244 | 9/1984 | Leigers | 56/15.5 |
| 4,491,183 | 1/1985 | Anderson et al. | 172/5 |
| 4,505,094 | 3/1985 | Demorest | 56/10.2 |
| 4,528,804 | 7/1985 | Williams | 56/10.2 |
| 4,726,175 | 2/1988 | Day et al. | 56/10.2 |
| 4,803,830 | 2/1989 | Junge et al. | 56/28 |
| 4,896,492 | 1/1990 | Junge et al. | 56/28 |
| 5,040,613 | 8/1991 | Dodd et al. | 172/5 |
| 5,105,609 | 4/1992 | Covington et al. | 56/13.5 |
| 5,181,572 | 1/1993 | Andersen et al. | 172/6 |
| 5,203,148 | 4/1993 | Schreiner et al. | 56/10.2 |
| 5,255,756 | 10/1993 | Follmer et al. | 172/6 |
| 5,307,611 | 5/1994 | Vardeman et al. | 56/10.2 |
| 5,343,677 | 9/1994 | Covington et al. | 56/10.2 |
| 5,782,072 | 7/1998 | Matthews | 56/10.2 |

*Primary Examiner*—Robert E. Pezzuto
*Assistant Examiner*—Nathan Mammen

[57] ABSTRACT

A row alignment system includes a plurality of row units mounted on the lift frame at the front of a harvester. One or more of the row units are transversely adjustable on the frame for alignment with the guess rows. One of the adjustable row units includes a mechanical feeler which moves in response to changes in alignment between the plant passage on the row unit and the row of crop being harvested by that row unit. A linkage connects the feeler directly to the spool of a three-position, four-way valve supported on the row unit closely adjacent the feeler. Movement of the feeler in response to row misalignment operates the valve to selectively extend or retract a cylinder to move the units to maintain the desired crop row/plant passage alignment. A manually operated valve assembly facilitates easy manual operation of the row units and permits the row units to be locked in a preselected position. When two or more transversely adjustable row units are controlled, the units are tied together with a bracket, and the cylinder is connected to the bracket.

20 Claims, 3 Drawing Sheets

ROW FINDER FOR A HARVESTING UNIT

BACKGROUND OF THE INVENTION

1) Field of the Invention

The present invention relates generally to agricultural implements such as a cotton harvester, and, more specifically, to structure for automatically aligning a row unit with a row of crop to be harvested.

2) Related Art

Harvesters such as cotton pickers include a plurality of row units supported on a transversely extending header frame and spaced so that each unit receives an individual row of crop. For optimum harvesting efficiency, the row of crop must be aligned with a row receiving area on the row unit. Sometimes the number of row units on the harvester differs from the number of planter rows on the planter used to plant the crop, and it becomes necessary for the harvester to simultaneously harvest rows planted in two different passes of the planter. The spacing between the rows of one planter pass and one or more adjacent rows (sometimes termed "guess rows") may vary considerably, and unless there is continuous adjustment of the row harvesting units for the guess rows, row misalignment and crop loss occur.

Various devices have been proposed to maintain row harvesting units in alignment with the rows of crops. U.S. Pat. No. 5,343,677 assigned to Case Corporation shows a system with a sensor for each of the movable row units connected to a controller which in turn controls an activation device to move the individual units to maintain the units in alignment with the crop rows. U.S. Pat. No. 5,782,072 issued to H. Wayne Matthews shows another row unit tracking system wherein a computer receives a signal from a sensor associated with one of the row units and calculates the amount of deviation between the crop row and the center of the row unit. A control signal is sent to a solenoid valve to actuate a cylinder which aligns the row unit with the row. Such systems have provided improved row alignment but are relatively complicated and expensive and require electronic controls. Some of the systems require expensive proportional valves. A simpler, more straight forward alignment system which is less expensive than most previously available alignment systems is desirable.

BRIEF SUMMARY OF THE INVENTION

It is therefore an object of the present invention to provide an improved row alignment system for a harvester. It is a further object to provide such a system which overcomes most or all of the aforementioned problems.

It is a further object of the present invention to provide an improved row alignment system for a harvester which obviates complicated computer controls or other electronic controls. It is a further object to provide such a system which does not require calculation of a deviation signal. It is still another object to provide such a system which eliminates the need for controllers and proportional valves to move row units.

It is still another object to provide an improved row alignment system for a harvester with a simple mechanical row sensor connected to a control valve for activating a cylinder and moving one or more row units into alignment with the crop row. It is a further object to provide such a system wherein the sensor, control valve and cylinder are easily accessible.

It is yet another object of the invention to provide an improved row alignment system for a harvester having a mechanical row feeler connected directly to a hydraulic control valve which automatically adjusts row unit spacing on the go. It is a further object to provide such a system wherein the valve is connected to the row unit closely adjacent the row receiving area for simple, reliable, and accurate operation. It is still another object to provide such a system which is easy to understand and simple to repair, and which can be operated in a manual mode or disabled easily to secure the movable row units in a selected position.

A row alignment system constructed in accordance with the teachings of the present invention includes a plurality of row units mounted on the lift frame at the front of a harvester. One or more of the row units are transversely adjustable on the frame for alignment with the guess rows. One of the adjustable row units includes a mechanical feeler which moves in response to changes in alignment between the plant passage on the row unit and the row of crop being harvested by that row unit. A linkage connects the feeler to the spool of a three-position, four-way valve supported on the row unit closely adjacent the feeler. The valve selectively extends or retracts a cylinder located between the lift frame and the adjustable row units to move the units to maintain the desired crop row/plant passage alignment. A valve assembly connected between the valve and the cylinder facilitates easy manual operation of the row units and permits the row units to be locked in a preselected position. When two or more transversely adjustable row units are controlled, the units are tied together with a special bracket. The cylinder is connected at one end to the lift frame and at the opposite end to the special bracket.

The alignment system is relatively uncomplicated and inexpensive and requires no electronic controls. The mechanical row sensor linked directly to a control valve for activating a cylinder provides a more straight forward alignment system which is simpler, less expensive and easier to access and service than at least most previously available alignment systems. The alignment system can be easily operated in a manual mode or disabled to secure the movable row units in a selected position.

These and other objects, features and advantages of the present invention will become apparent to one skilled in the art upon reading the following detailed description in view of the drawings.

DETAILED DESCRIPTION OF THE DRAWINGS

Figure 1:
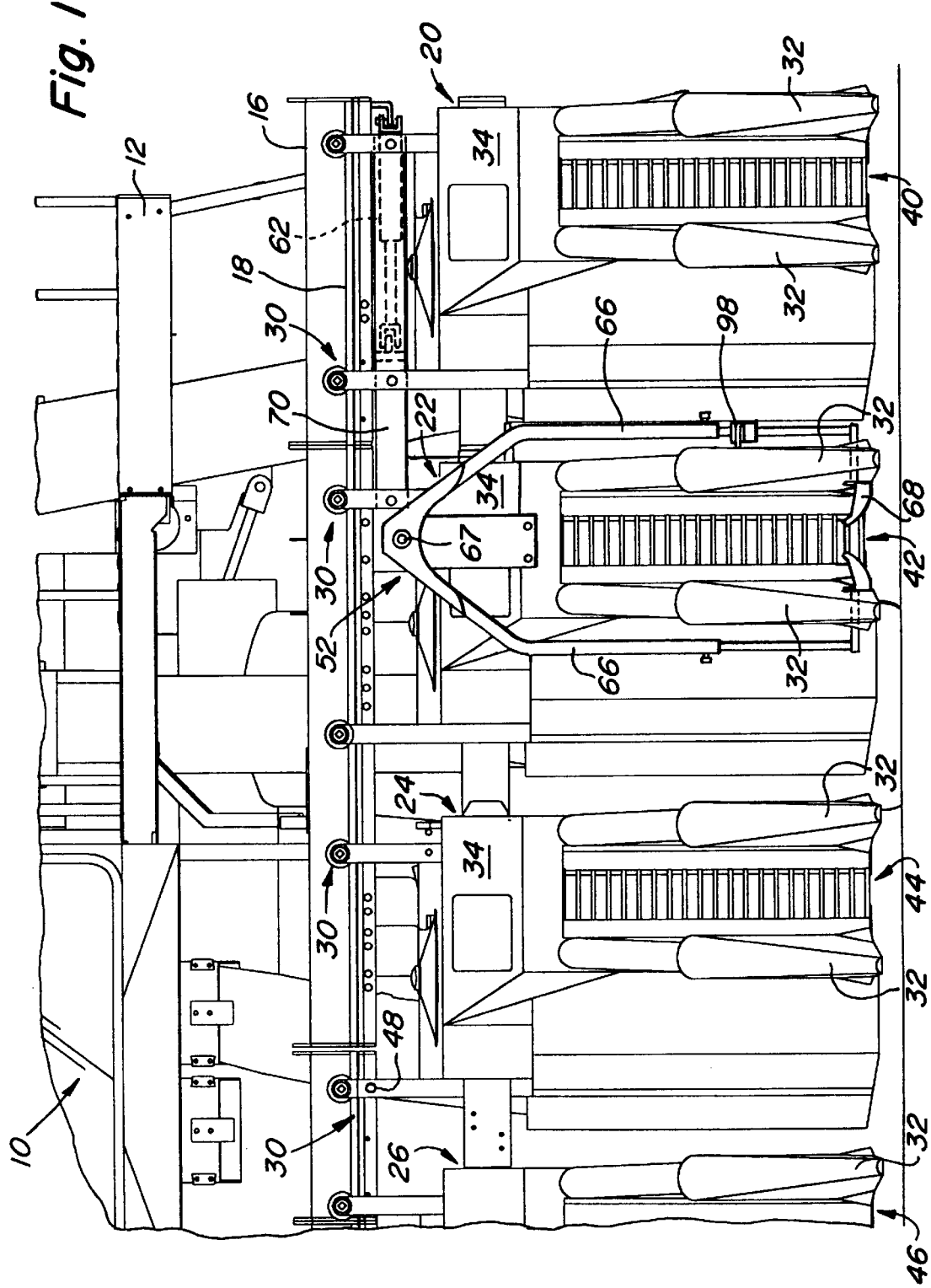
FIG. 1 is a front view of a portion of a cotton harvester with the row unit row finder structure attached.

Referring now to FIG. 1, therein is shown a cotton harvester 10 having a main frame 12 supported for forward movement over ground for harvesting rows of crop. A transversely extending row unit support 16 is mounted on the forward end of the frame and includes rails 18 for adjustably mounting a plurality of row units 20, 22, 24 and 26. As many as six row units can be carried on the support 16. The row units include hanger and roller assemblies 30 generally of the type shown and described in U.S. Pat. No. 4,896,492 assigned to Deere and Company, supporting the units 20–26 for transverse adjustment along the rails 18 for accommodating differing row spacings. The row units include spaced stalk lifters 32 extending upwardly in the rearward direction to connections with row unit housings 34 which support conventional cotton harvesting mechanisms for removing cotton bolls from the rows of crop. Row receiving areas 40–46 defined between the lifters 32 for the corresponding row units 20–26 are adapted for alignment with the rows of cotton plants. Pin structure 48 on the assemblies 30 is insertable into spaced apertures adjacent the rails 18 for locking selected units in preselected positions corresponding to the fixed row spacings of the cotton rows.

To provide transverse adjustment for automatically aligning row units with the crop rows, for example, when the harvester 10 is harvesting rows planted in two separate planter passes, a row alignment system 50 (FIG. 3) is connected to the harvester 10 to maintain the row units (20 and 22 as shown in FIG. 1) in alignment with the guess rows. The system 50 includes a crop row feeler assembly 52 supported by one of the movable row units (22 of FIG. 1) which pivots with changes in alignment between the row of crop and the row receiving area 42. A three position, four-way hydraulic valve 54 includes an actuator 56 connected to the spool of the valve 54 and to the lower end of the feeler assembly 52. The valve 54 is connected by hydraulic lines 58 through a manual control valve block 59 to a source 60 of hydraulic fluid under pressure and to a hydraulic cylinder 62 connected between the row unit support 16 and one of the movable row units (22). The valve 54 is supported on the side of the row lifter 32 adjacent the feeler assembly 52.

The feeler assembly 52, generally of the pendulum type shown and described in U.S. Pat. No. 5,307,611 assigned to Orthman Manufacturing, Inc. of Lexington, Nebr., includes side arms 66 connected to the row unit housing 34 by a pivot 67. The side arms 66 extend downwardly adjacent the stalk lifters 32 on either side of the row receiving area 42. At the lower ends of the arms 66, stalk feelers 68 extend inwardly to follow the lower portions of the cotton stalks. If the row of cotton plants is aligned with the row receiving area, the arms 66 will be maintained in a neutral, centered position. However, if the crop row and the row receiving area become misaligned, the feeler assembly 52 will pivot. The actuator 56 is connected near the lower end of one of the side arms 66, and as the side arm 66 rocks with the misalignment, the spool of the valve 54 is moved in the direction which causes the cylinder 62 to extend or retract as necessary to move the row unit 42 into alignment with the guess row. As shown in FIG. 1, the left outer two row units 40 and 42 are tied together by a bracket assembly 70 to align with two guess rows (for example, when harvesting six rows of cotton planted by a four row planter). The cylinder 62 is connected to the bracket assembly 70 to move the row units in response to movement of the feeler to maintain a preselected alignment between the crop rows and the row receiving areas.

Figure 2:
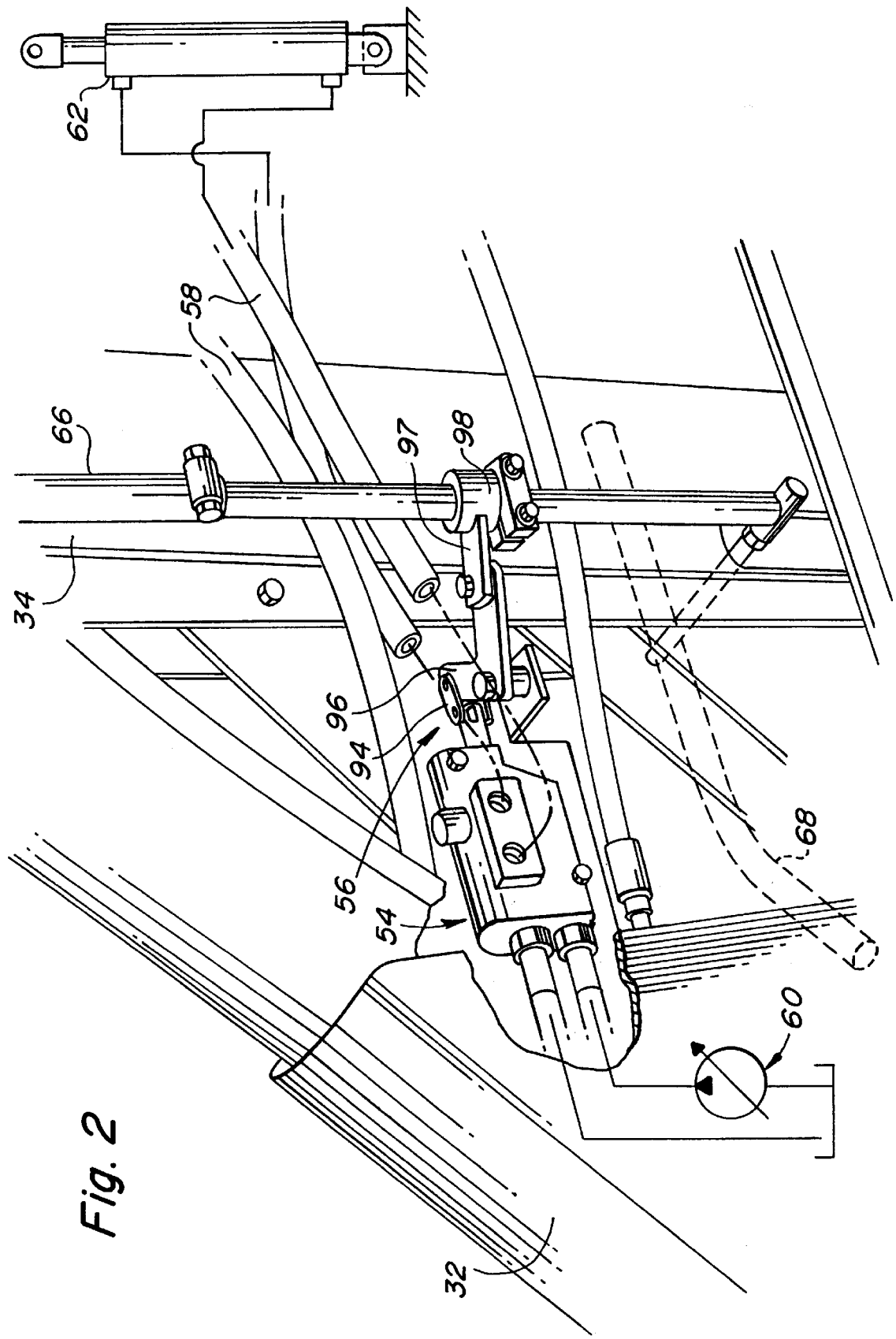
FIG. 2 is an enlarged side perspective view of one of the row units of FIG. 1 partially broken away to show the valve and actuator for the row finder structure of FIG. 1.
Figure 3:
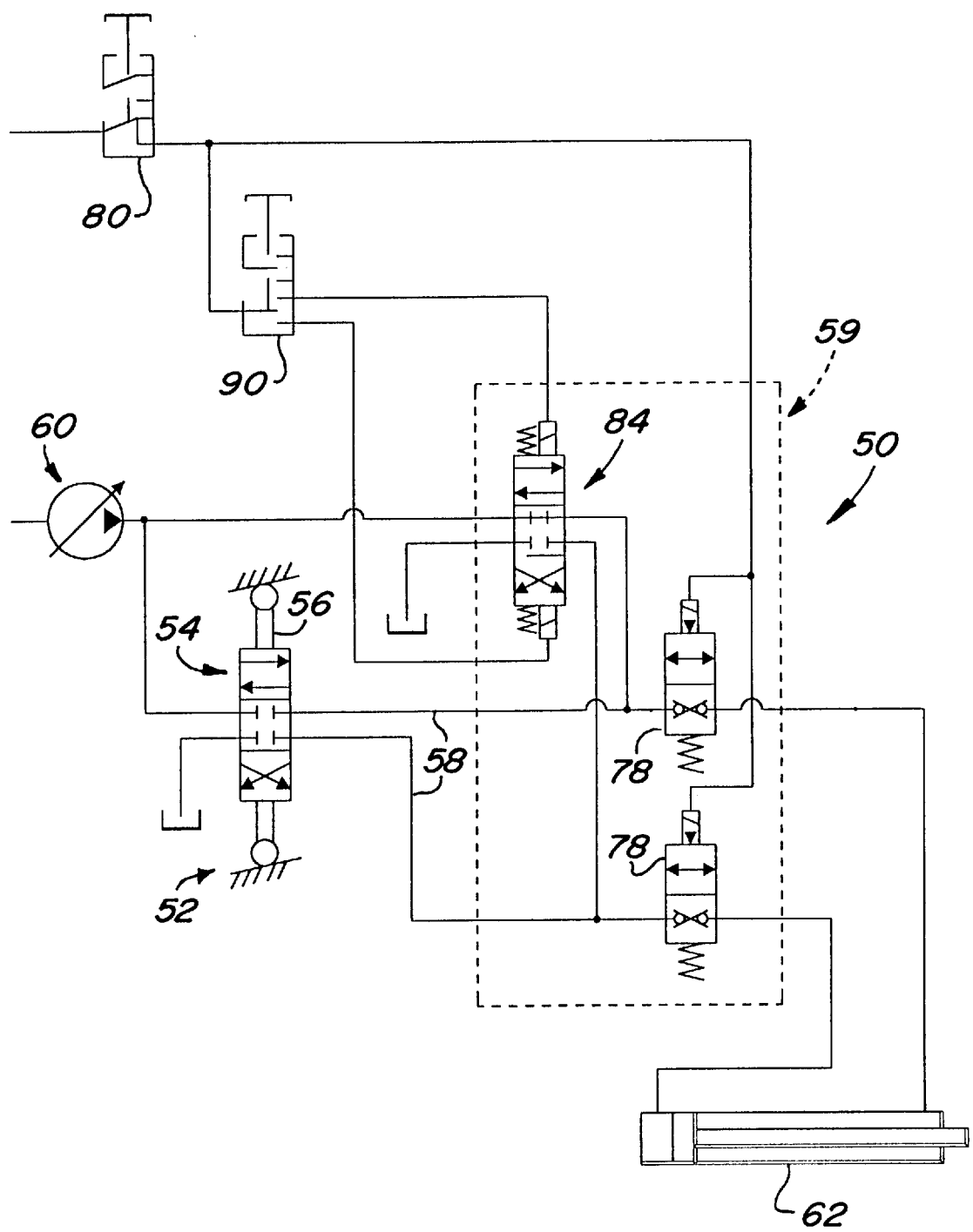
FIG. 3 is a schematic of the hydraulic circuit for the row finder structure of FIG. 1.

As shown, the valve 54 is a simple three position, four way reversing valve mounted adjacent the stalk lifter 32 (FIG. 2) and adjacent the lower end of the corresponding arm 66. The valve 54 has a neutral central position (shown in FIG. 3) corresponding to the neutral, centered position which the arms 66 assume when the crop row is centered with respect to the row receiving area 42. When the rows begin misaligning to the left relative to the row receiving areas 40 and 42, the arms 66 will pivot to the left to move the spool of the valve 54 (down as shown in FIG. 3) to retract the cylinder 62 until the arms again move to the centered position and the valve assumes the neutral central position shown. Row misalignment to the right moves the spool of the valve 54 in the opposite direction (up as shown in FIG. 3) to extend the cylinder 62 until the row is centered with respect to the row receiving area 42 and the valve 54 again assumes the neutral position.

The manual control valve block 59 includes a pair of electrohydraulic blocking valves 78 connected to the lines 58 between the valve 54 and the rod and base ends of the cylinder 62. The valves 78 are connected to an on-off switch 80 in the cab of the harvester 10. Activating the switch 80 moves the valves to their non-blocking positions for automatic operation of the system 50. By moving the switch 80 to the off position, the valves 78 assume the blocking position (shown) which prevents movement of the cylinder 62 and secures the row units 20 and 22.

The block 59 also includes an electrically controlled three position, four way valve 84 for manually operating the cylinder 62. The valve 84 is connected to the source 60 and to the lines 58 upstream of the blocking valves 78. A control switch 90 has an input terminal connected to the output of the on-off switch 80 so the valve 84 can only be activated when the switch 80 is in the on position. A pair of output terminals on the switch 90 are connected to the solenoid control of the valve 84. The switch 90 has a central off position, a right position wherein the valve 84 is activated to extend the cylinder 62 to move the row units 20 and 22 to the right, and a left position to activate the valve 84 to retract the cylinder 62 and move the units to the left.

The linkage connecting the arm 66 with the spool includes a link 94 pivotally connected to the valve actuator 56 and to one end of an intermediate member 96 pivotally connected to the row unit. The opposite end of the member 96 is connected to an arm 97 which projects radially from a collar 98 supported at the lower end of the side arm 66. As the arm 66 moves outwardly (to the left), the member 96 pivots to extend the actuator and move the valve 54 from the neutral blocking position to the position to retract the cylinder 62 and move the row units 20 and 22 to the left. Movement of the side arm to the right causes the cylinder 62 to extend and move the row units 20 and 22 to the right.

The row units 20 and 22 are connected by the bracket assembly 70 which extends between the hanger and roller assemblies 30 on the outermost unit 20 and the adjacent assembly 30 on the unit 22. The cylinder 62 has a base end pinned to the end of the row unit support 16 and extends horizontally to a rod end connection with the bracket assembly 70. The bracket assembly 70 provides adjustable spacing between the units 20 and 22 to match the particular row spacings in a field.

Having described the preferred embodiment, it will become apparent that various modifications can be made without departing from the scope of the invention as defined in the accompanying claims.

What is claimed is:

1. In a harvester having a transversely extending row unit support frame, and a plurality of row units transversely spaced on the frame including at least one movable row unit supported for transverse movement on the support frame and having a row receiving area adapted for alignment with a row of crop, a row unit alignment system comprising:

a crop row feeler supported by the movable row unit, the feeler movable with changes in alignment between the row of crop and the row receiving area;

a hydraulic valve including an actuator supported adjacent the crop row feeler and mechanically connected to the feeler for movement therewith;

a hydraulic cylinder connected between the support frame and the movable row unit, and a hydraulic line connecting the hydraulic valve to the cylinder and to a source of hydraulic fluid under pressure for operating the cylinder to move the row unit in response to movement of the actuator by the row crop feeler to maintain a preselected alignment between the crop row and the row receiving area.

2. The row alignment system set forth in claim 1 wherein the crop row feeler includes pendulum structure extending downwardly along side of the row receiving area, and wherein the actuator is located along side of the row receiving area adjacent the pendulum structure.

3. The row alignment system as set forth in claim 2 wherein the hydraulic valve is located along side of the row receiving area adjacent the pendulum structure.

4. The row alignment system as set forth in claim 2 wherein the pendulum structure includes an upper pivot area and an upright arm extending downwardly from the pivot area, and wherein the actuator is connected to the upright arm.

5. The row alignment system set forth in claim 4 wherein the pendulum structure includes a lowermost portion adjacent the row receiving area, and the actuator is connected to the lowermost portion.

6. The row alignment system as set forth in claim 5 wherein the hydraulic valve is located adjacent the lowermost portion, and further comprising a link pivotally connected between the lowermost portion and the hydraulic valve.

7. The row alignment system as set forth in claim 1 wherein the hydraulic valve includes a spool, and the actuator includes a link connecting the spool and the feeler.

8. The row alignment system as set forth in claim 1 wherein the harvester includes two adjacent movable row units supported for transverse movement on the support frame, and a transverse member extending between the two adjacent movable row units and constraining the units for movement in unison, and wherein the hydraulic cylinder is connected to the transverse member.

9. In a harvester having a transversely extending row unit support frame, and a plurality of row units transversely spaced on the frame including at least one movable row unit supported for transverse movement on the support frame and having a row receiving area adapted for alignment with a row of crop, a row unit alignment system comprising:

a mechanical crop row feeler supported by the movable row unit, the feeler including a lowermost portion adapted for contacting the row of crop and movable with changes in alignment between the row of crop and the row receiving area;

an operable hydraulic valve supported adjacent the crop row feeler and mechanically connected to the feeler for operation in response to movement of the crop row feeler;

a hydraulic cylinder connected between the support frame and the movable row unit, and wherein the hydraulic valve is connected to the hydraulic cylinder and to a source of hydraulic fluid under pressure for operating the hydraulic cylinder to move the row unit in response to operation of the hydraulic valve by movement of the feeler to automatically maintain a preselected alignment between the crop row and the row receiving area.

10. The row alignment system set forth in claim 9 wherein the hydraulic valve is connected directly to the lowermost portion of the feeler.

11. The row alignment system set forth in claim 9 wherein the hydraulic valve has a neutral position corresponding to the preselected alignment between the crop row and the row receiving area, and an extend position for moving the hydraulic cylinder in a first direction, and a retract position for moving the hydraulic cylinder in a second direction opposite the first direction.

12. The row alignment system set forth in claim 9 further including a valve assembly connected between the hydraulic valve and the hydraulic cylinder for selectively limiting operation of the hydraulic cylinder to maintain row unit position.

13. The row alignment system set forth in claim 9 further including a valve assembly connected to the hydraulic valve for selectively moving the row unit independently of crop row alignment.

14. The row alignment system set forth in claim 9 wherein the operable hydraulic valve is a non-proportional reversing valve.

15. The row alignment system set forth in claim 14 wherein the operable hydraulic valve comprises a four way, three position valve.

16. The row alignment system set forth in claim 15 wherein the operable hydraulic valve includes a spool connected to the lowermost portion of the crop row feeler.

17. A crop harvester row unit row alignment system for a plurality of row units carried on a row unit support by hanger and roller assemblies, including:

a bracket connecting at least two of the row units for transverse movement together on the row unit support;

an actuatable cylinder connected between the two of the row units and the row unit support;

a mechanical feeler movable in response to changes in alignment between one of the two of the row units and a corresponding row of crop;

a hydraulic valve including a spool;

a mechanical link connected to the mechanical feeler and to the spool, the spool movable with the feeler in response to the changes in alignment; and a hydraulic line connecting the hydraulic valve to the cylinder to actuate the cylinder and maintain a preselected alignment between the one of the two of the row units and the corresponding row of crop.

18. The crop harvester row unit row alignment system as set forth in claim 17 wherein the cylinder is connected between the row unit support and the bracket.

19. The crop harvester row unit row alignment system as set forth in claim 17 wherein the bracket is connected to the hanger and roller assemblies.

20. The crop harvester row unit alignment system as set forth in claim 17 wherein the one of the two of the row units includes stalk lifter structure and wherein the hydraulic valve is supported adjacent the stalk lifter structure.

* * * * *